(12) United States Patent
Gee

(10) Patent No.: US 7,155,320 B2
(45) Date of Patent: Dec. 26, 2006

(54) DISTRIBUTED POWER DELIVERY SYSTEM

(75) Inventor: Mikel Gee, Concord, CA (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 09/683,300

(22) Filed: Dec. 11, 2001

(65) Prior Publication Data

US 2003/0109965 A1   Jun. 12, 2003

(51) Int. Cl.
G05D 3/12 (2006.01)
G05D 5/00 (2006.01)
G05D 9/00 (2006.01)
G05D 11/00 (2006.01)
G05D 17/00 (2006.01)

(52) U.S. Cl. .................. 700/295; 700/297; 307/18; 307/64; 307/85

(58) Field of Classification Search ............... 700/286, 700/291, 295, 297; 307/18, 21, 29, 38, 59, 307/64, 65, 68, 85, 66, 86
See application file for complete search history.

(56) References Cited

U.S. PATENT DOCUMENTS

| | | | | |
|---|---|---|---|---|
| 4,324,987 A | * | 4/1982 | Sullivan et al. ............. | 700/295 |
| 4,827,152 A | * | 5/1989 | Farkas ............................ | 307/68 |
| 5,579,197 A | * | 11/1996 | Mengelt et al. ................ | 307/66 |
| 5,602,462 A | * | 2/1997 | Stich et al. .................... | 307/64 |
| 5,652,893 A | * | 7/1997 | Ben-Meir et al. ........... | 713/300 |
| 6,150,736 A | | 11/2000 | Brill | |
| 6,215,202 B1 | * | 4/2001 | Luongo et al. ................ | 307/64 |
| 6,239,513 B1 | * | 5/2001 | Dean et al. .................... | 307/64 |
| 6,288,456 B1 | * | 9/2001 | Cratty ........................... | 307/64 |
| 6,445,163 B1 | * | 9/2002 | Chenier et al. .............. | 320/133 |
| 6,452,289 B1 | * | 9/2002 | Lansberry et al. ........... | 700/295 |
| 6,583,521 B1 | * | 6/2003 | Lagod et al. .................. | 307/70 |
| 6,657,320 B1 | * | 12/2003 | Andrews et al. .............. | 307/64 |
| 6,751,562 B1 | * | 6/2004 | Blackett et al. ............. | 700/286 |
| 2002/0036430 A1 | * | 3/2002 | Welches et al. ............... | 307/18 |
| 2002/0169523 A1 | * | 11/2002 | Ross et al. ................... | 700/286 |

* cited by examiner

Primary Examiner—Leo Picard
Assistant Examiner—Charles Kasenge
(74) Attorney, Agent, or Firm—Rodney M. Young, Esq.; Armstrong Teasdale LLP

(57) ABSTRACT

A method for supplying power includes supplying power to at least one critical device, supplying power to at least one essential device, and remotely removing power to the essential device while maintaining power to the critical device.

19 Claims, 3 Drawing Sheets

DISTRIBUTED POWER DELIVERY SYSTEM

BACKGROUND OF INVENTION

This invention relates generally to distributed power delivery systems and, more particularly, to remote monitoring and diagnosing distributed power delivery systems.

At least some entities have both essential power requirements and critical power requirements. For example, a call center typically has heating, ventilation, and air conditioning (HVAC) requirements that are essential but not critical to the call center's operation. The call center also has computer and communication power requirements that are critical to the call center's operation.

SUMMARY OF INVENTION

In one embodiment, a method for supplying power is provided. The method includes supplying power to at least one critical device, supplying power to at least one essential device, and remotely removing power to the essential device while maintaining power to the critical device.

In another embodiment, an energy management system is provided. The system includes a generation module and at least one power distribution unit remote from the generation module and communicatively coupled to the generation module. The system also includes a master control system remote from the generation module and the power distribution unit, the master control system is communicatively coupled to the generation module and the power distribution unit.

In a further embodiment, an energy management system is provided that includes a generation module comprising at least two power sources. The system also includes at least two power distribution units remote from the generation module and communicatively coupled to the generation module, at least one of the power distribution units is connected to at least one critical device, at least one of the power distribution is unit connected to at least one essential device. The system also includes master control system remote from the generation module and the power distribution unit, the master control system is communicatively coupled to the generation module and the power distribution unit. The master control system is configured to remotely monitor the generation module and instruct the power distribution unit connected to the essential device to stop supplying power to the essential device.

DETAILED DESCRIPTION

Figure 1:
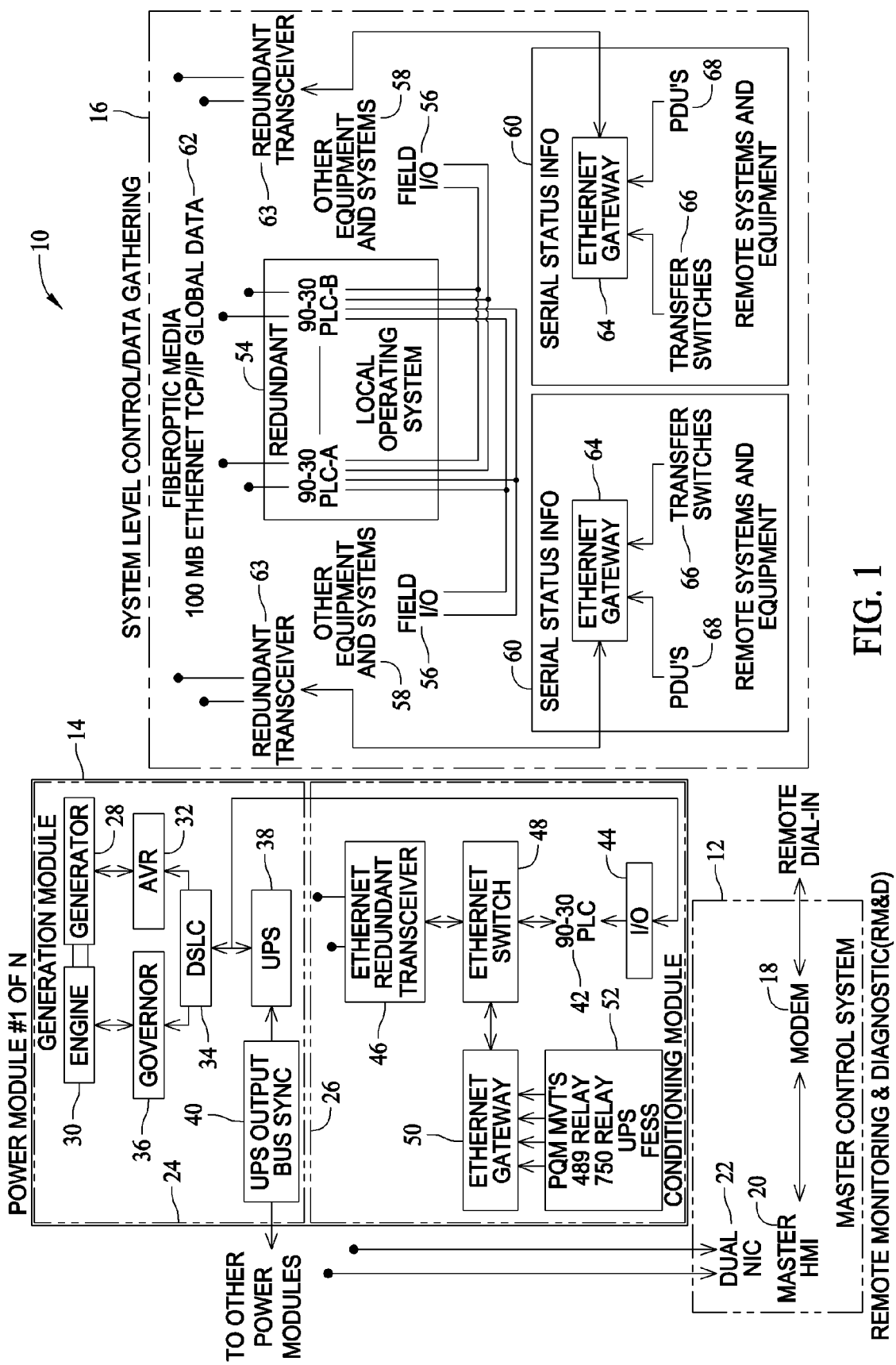
FIG. 1 is a schematic view of an embodiment of a remote monitoring and diagnostic system.

FIG. 1 is a schematic view of an embodiment of a remote monitoring and diagnostic system 10 including a master control system 12, at least one power module 14, and a control/data gathering system 16. Master control system 12, power module 14, and control/data gathering system 16 are operationally coupled together such that master control system 12, power module 14, and control/data gathering system 16 communicate therebetween. Master control system 12 includes a modem 18, a human machine interface (HMI) 20, and at least one network interface card (NIC) 22. In an exemplary embodiment, system 10 includes a dual NIC 22. Power module 14 includes a generation module 24 and a conditioning module 26 operationally coupled to generation module 24. Generation module 24 includes a generator 28 coupled to an engine 30. Generator 28 is controlled by an automatic voltage regulator 32 coupled to a digital synchronizer and load control module (DSLC) 34. DSLC 34 is also coupled to a governor 36 for engine 30. Generation module 24 also includes an uninterrupted power supply (UPS) 38 coupled to an UPS ouput bus 40 connecting multiple power modules 14 together. In one embodiment, instead of including an UPS 38, generation module 24 includes a connection to an utility company. Additionally, in another embodiment, generation module 24 includes UPS 38 and a connection to the utility company.

Conditioning module 26 includes a programmable logic controller (PLC) 42 such as, for example, but not limited to, a 90-30 series PLC available from GE Fanuc Automation North America, Inc. Charlottesville Va. PLC 42 includes an Input Output module (I/O) 44 coupled to DSLC 34 and UPS 38. PLC 42 is coupled to an Ethernet redundant transceiver 46 via an Ethernet switch 48. An Ethernet gateway 50 couples at least one power information device 52 to Ethernet switch 48. Power information devices 52 include power quality monitoring devices, generator management relays (such as a 489 relay and a 750 relay both available from the General Electric Company, Schenectady N.Y.), UPS's, flywheel energy storage systems (FESS), and MicroVersaTrip®'s (such as MicroVersaTrip® Pm and MicroVersTrip® Pro both also available from the General Electric Company).

Control/data gathering system 16 includes redundant PLC's 54 connected to field I/O's 56 for other equipment and systems 58. Redundant PLC's 54 are connected to a plurality of remote systems 60 via an Ethernet 62 and redundant transceivers 63. Each remote system 60 includes an Ethernet gateway 64 connected to transfer switches 66 and power distribution units (PDU) 68. System 10 is configured to monitor critical data from all system 10 components and provide alarms and warnings when appropriate. System 10 also records and analyzes power waveforms, and performs statistical process control analysis of critical values. System 10 is also configured to record historical data, generate reports, and track data trending. Specifically, redundant PLC's 54 in control/data system 16 are in remote communication with one or more power modules 14 and are programmed to perform the above mentioned functions. Control/data gathering system 16 is controlled by master control system 12. For example, an operator utilizes HMI 20 to interface with redundant PLC's 54 to view power data. Additionally, the operator can program redundant PLC's 54 via HMI 20.

In use, system 10 provides power to a plurality of PDU's 68 wherein at least one PDU 68 supplies power to critical equipment and at least one PDU 68 supplies power to essential equipment. Critical equipment as used herein refers to equipment that is typically mandatory for a successful operation of a particular business. For example, computers and telephone systems are critical to a call center, while routers are critical to an Internet Service Provider (ISP). Essential equipment as used herein refers to equipment that is not typically mandatory for the successful operation of a particular business. For example, HVAC equipment is not typically mandatory for a call center.

System 10 monitors power availability from generator 28 and UPS 38, and power consumption by PDU's 68. When electrical loads should be shed, system 10 sheds essential loads while keeping critical loads. Specifically, the PDU 68 supplying power to essential equipment ceases to supply the essential equipment with power. The PDU 68 supplying power to the critical equipment continues to supply the critical equipment with power. Additionally, when not supplying power to the essential equipment, system 10 stores power in the FESS.

Figure 2:
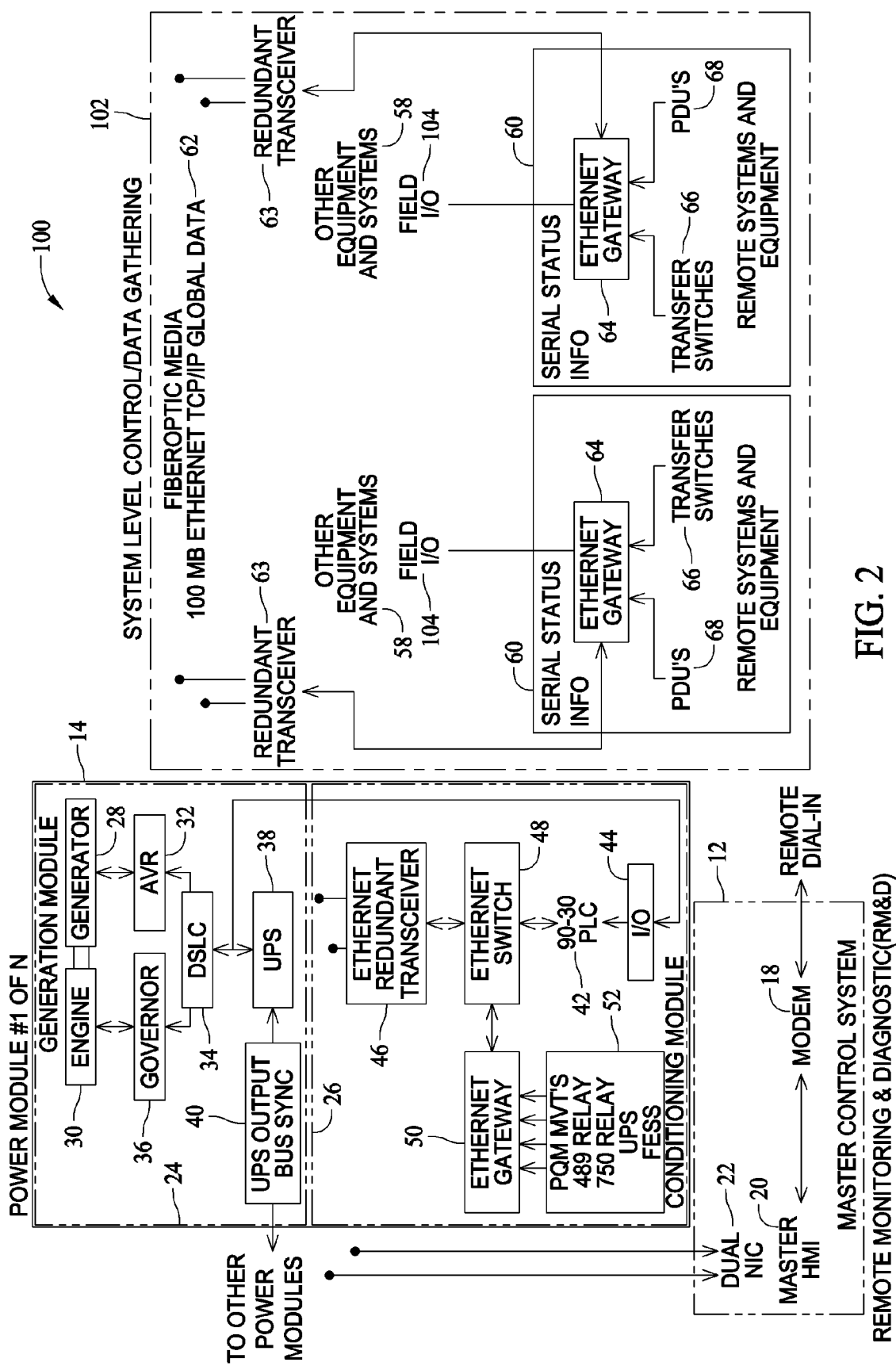
FIG. 2 is an alternative embodiment of a remote monitoring and diagnostic system substantially similar to the system shown in FIG. 1.

FIG. 2 is an alternative embodiment of a remote monitoring and diagnostic system 100 substantially similar to system 10 shown in FIG. 1 and components in system 100 that are identical to components in system 10 are identified in FIG. 2 using the same reference numerals used in FIG. 1. System 100 includes a control/data gathering circuit 102 including a plurality of remote field I/O's 104. System 100 operates substantially similar to system 10 but in system 100 PLC 42 performs the monitoring and control that redundant PLC's 54 do in system 10. For example, system 100 monitors power availability from generator 28 and UPS 38, and power consumption by PDU's 68, PLC 42 directs the PDU 68 supplying power to essential equipment to cease supplying the essential equipment with power. When the available power returns to normal levels, PLC 42 directs the PDU 68 supplying power to the essential equipment to resume supplying the essential equipment with power.

Figure 3:
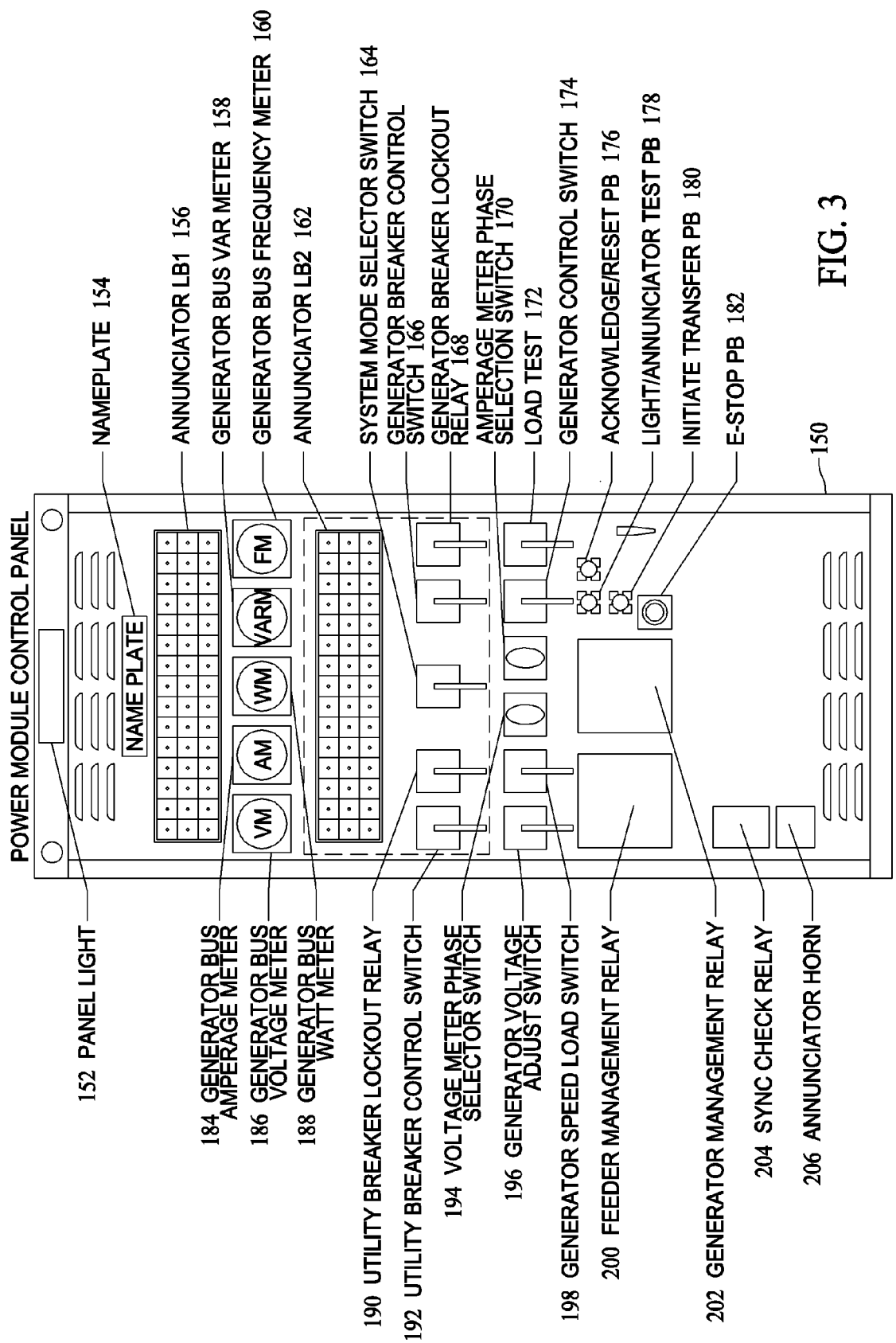
FIG. 3 is a schematic view of a power module control panel for the power module shown in FIG. 1.

FIG. 3 is a schematic view of a power module control panel 150 for power module 14 (shown in FIG. 1). Panel 150 includes a panel light 152, a nameplate 154, and a first annunciator 156. Panel 150 also includes a generator bus volts amp reactive (VAR) meter 158, a generator bus frequency meter 160, and a second annunciator 162. Panel 150 also includes a system mode selector switch 164, a generator breaker control switch 166, and a generator breaker lockout relay 168. Panel 150 further includes an amperage meter phase selection switch 170, a load test switch 172, and a generator control switch 174. Panel 150 also includes a acknowledge/reset biased actuator 176, a light/annunciator test biased actuator 178, a initiate transfer biased actuator 180, and a emergency stop biased actuator 182. In an exemplary embodiment, actuators 176, 178, 180, and 182 are push buttons. Panel 150 further includes a generator bus amperage meter 184, a generator bus voltage meter 186, a generator bus watt meter 188, and a utility breaker lockout relay 190. Panel 150 also includes a utility breaker control switch 192, a voltage meter phase selection switch 194, a generator voltage adjust switch 196, and a generator speed load switch 198. Panel 150 also includes a feeder management relay 200, a generator management relay 202, a synchronous check relay 204, and an annunciator horn 206.

While the invention has been described in terms of various specific embodiments, those skilled in the art will recognize that the invention can be practiced with modification within the spirit and scope of the claims.

The invention claimed is:

1. A method for supplying power, said method comprising:
supplying power to at least one critical device;
supplying power to at least one essential device;
remotely removing power to the at least one essential device while maintaining power to the at least one critical device, wherein said remotely removing power comprises remotely discontinuing power on receiving an instruction via the Ethernet to remotely remove power;
storing power supplied by at least one of a generator and a utility power source in an energy storage system when a supply of power to the at least one essential device is discontinued; and
resuming supply of power to the at least one essential device upon determining that power supplied by the generator and an uninterrupted power supply is returned to a level.

2. A method in accordance with claim 1 wherein remotely removing power comprises remotely removing power to the at least one essential device while maintaining power to the at least one critical device based on remotely monitoring the supplied power to the at least one critical device and the supplied power to the at least one essential device.

3. A method in accordance with claim 2 further comprising:
capturing a waveform for the power supplied to the at least one critical device; and
capturing a waveform for the power supplied to the at least one essential device.

4. A method for supplying power, said method comprising:
supplying power to at least one critical device;
supplying power to at least one essential device;
remotely removing power to the at least one essential device while maintaining power to the at least one critical device, wherein said remotely removing power comprises remotely discontinuing power on receiving an instruction via the Ethernet to remotely remove power and comprises remotely removing power to the at least one essential device while maintaining power to the at least one critical device based on remotely monitoring the supplied power to the at least one critical device and the supplied power to the at least one essential device;
storing power in a storage device when a supply of power to the at least one essential device is discontinued;
capturing a waveform for the power supplied to the at least one critical device;
capturing a waveform for the power supplied to the at least one essential device;
logging data relating to the power supplied to the at least one critical device;
logging data relating to the power supplied to the at least one essential device; and
trending the data relating to the power supplied to the at least one critical device, the data relating to the power supplied to the at least one essential device, and the captured waveforms to determine when to remove power from the at least one essential device.

5. A method in accordance with claim 1 wherein said storing power comprises storing power with a flywheel energy storage system when a supply of power to the at least one essential device is discontinued.

6. An energy management system comprising:
a generation module including at least one of a utility power source and a generating power source;
a first set of at least one power distribution unit remote from said generation module and communicatively coupled to said generation module, wherein at least one of said at least one power distribution unit in the first set is connected to at least one essential device;
a master control system remote from said generation module and said at least one power distribution unit in the first set, said master control system communicatively coupled to said generation module and said at least one power distribution unit in the first set;

an energy storage system configured to store power supplied by at least one of said utility power source and said generating power source when said at least one power distribution unit in the first set discontinues supplying power to the at least one essential device; and a programmable logic controller configured to direct said at least one power distribution unit in the first set to resume supply of power to the at least one essential device upon determining that power supplied by said generation module is returned to a level.

7. A system in accordance with claim 6 wherein said generation module comprises at least two power sources, said master control system configured to remotely monitor and diagnose said at least two power sources.

8. A system in accordance with claim 6 wherein said system further comprises a second set of at least two power distribution units remote from said generation module and communicatively coupled to said generation module, at least one of said at least two power distribution units within the second set connected to at least one critical device, said master control system configured to remotely monitor said generation module and instruct said at least one power distribution unit in the first set connected to the at least one essential device to stop supplying power to the at least one essential device.

9. A system in accordance with claim 6 further comprising a conditioning module communicatively coupled to said generation module and said master control system, said master control system configured to remotely condition power from said generation module.

10. A system in accordance with claim 9 wherein said generation module comprises at least two power sources, said master control system configured to remotely manage which of the at least two power sources provides power.

11. A system in accordance with claim 10 wherein said at least two power sources comprises said utility power source and said generating power source.

12. A system in accordance with claim 10 further comprising a flywheel energy storage system coupled to at least one of said at least two power sources.

13. A system in accordance with claim 6 further comprising a flywheel energy storage system coupled to said generation module.

14. A system in accordance with claim 8 wherein said generation module comprises at least two power sources, said master control system configured to remotely manage which of the at least two power sources provides power to said at least one power distribution unit within the first set and said at least two power distribution units within the second set.

15. A system in accordance with claim 14 wherein said at least two power sources comprises said utility power source and said generating power source.

16. A system in accordance with claim 15 further comprising a flywheel energy storage system coupled to at least one of said at least two power sources.

17. A system in accordance with claim 15 further comprising an uninterrupted power supply.

18. An energy management system comprising:

a generation module comprising at least two power sources comprising a generator and a utility power source;

at least two power distribution units remote from said generation module and communicatively coupled to said generation module, at least one of said power distribution units connected to at least one critical device, remaining of said power distribution units connected to at least one essential device;

a master control system remote from said generation module and said power distribution units, said master control system communicatively coupled to said generation module and said power distribution units, said master control system configured to remotely monitor said generation module and instruct the remaining of said power distribution units connected to the at least one essential device to stop supplying power to the at least one essential device;

an energy storage system configured to store power supplied by at least one of said generator and said utility power source when the remaining of said power distribution units connected to the at least one essential device is not supplying power to the at least one essential device; and a programmable logic controller configured to direct at least one of the remaining of said power distribution units to resume supply of power to the at least one essential device upon determining that power supplied by said generating module is returned to a level.

19. A system in accordance with claim 18 wherein said master control system configured to remotely monitor said generation module using a plurality of programmable logic controllers (PLC's).

* * * * *